3,056,809
METHOD FOR INTRODUCING AN OXYGEN FUNCTION INTO A STEROID MOLECULE CONTAINING AN ENOL GROUP AND COMPOUNDS THEREOF
Derek Harold Richard Barton, Joseph Elks, and Esme Joan Bailey, London, England, assignors to Glaxo Laboratories Limited, Greenford, England, a British company
No Drawing. Filed Nov. 4, 1960, Ser. No. 66,941
Claims priority, application Great Britain Nov. 6, 1959
15 Claims. (Cl. 260—397.4)

This invention is concerned with improvements in or relating to the preparation of steroid derivatives and more particularly with the introduction of oxygen functions into steroid molecules.

An important characteristic of many pharmacologically-active steroids is the presence of an oxygen function, e.g. a keto or a hydroxy group, at one or more positions of the molecule, particularly at the 3-, 11-, 17- and/or 20-positions, and hence in work on the synthesis of such compounds it is desirable to have available a method of oxygenation which is convenient to use and in general gives rise to well defined products in reasonable yield. Various methods, both chemical and micro-biological, have been proposed for the introduction of oxygen functions into steroid molecules but frequently such methods suffer from disadvantages for example requiring several separate stages and/or giving poor yield. For example, in the manufacture of adreno-cortical steroids the intermediates used are invariably lacking in a 17α-hydroxyl group and the introduction of this group has been the subject of extensive study and research. The methods so far evolved require multi-stage reactions which naturally involve concomitant loss in yield at each stage. Although some of the methods proposed have been applied on an industrial scale and the desired oxygenated steroids have been obtained in good yield there still remains a desire for methods which are more direct or are otherwise more convenient. There is, for example, a need for a more selective method of hydroxylation at $C_{(17)}$ since existing methods sometimes give rise to difficulty because of interference by other groups or simultaneous reaction of other groups, e.g. a 9,11-double bond, with the reagents used.

The present invention provides a new method of introducing an oxygen function into certain steroid molecules which method has various advantageous features. Our invention is based upon the discovery that steroid enols can be reacted with oxygen to introduce a hydroperoxy group, frequently in good yield. The resulting hydroperoxide may be stable in which case it can be isolated and converted to another oxygen function, or it may spontaneously decompose, in general with formation of an oxo group. Whether or not the hydroperoxide is isolated the process is simple to carry out and the yields are often good compared with other methods of introducing oxygen functions.

The hydroperoxide is in general only stable when the carbon atom to which it is attached is tertiary and thus for example secondary hydroperoxides in general decompose to the corresponding ketone. For example, a 3-keto steroid gives the 2,3-diketone without isolation of the intermediate hydroperoxide. Similarly, a 12-ketone gives the 11,12-diketone.

It is of course not necessary to convert the hydroperoxy group to a hydroxyl group since one may use the former as a basis for other transformations.

According to the invention, therefore, there is provided a process for the introduction of an oxygen function into a steroid molecule which comprises oxygenating a steroid having at least one enol group, nuclear or extra-nuclear, with molecular oxygen to form a hydroperoxy group on said steroid, which hydroperoxy group may then, depending on its stability, either spontaneously decompose to an oxo group, or, if desired, be reduced to another oxygen function e.g. a hydroxy group.

Generally speaking the hydroperoxide group will be formed at a nuclear carbon atom adjacent to the hydroxy group of said enol group but in the case of enols derived from α:β-unsaturated ketones however the hydroperoxide may appear at the γ-position.

The enol steroids used in accordance with the invention may be obtained by enolisation of the corresponding keto steroid which of course results in the formation of a mixture of tautomers. If the enolising agent is weak in action then the concentration of enol will be low. This should be avoided since if the concentration of enol is too low it may not be possible to oxygenate the steroid or, alternatively, only low-yields of the desired end-product may be obtained. Consequently it is desirable to produce as high a concentration of enol as possible and this is preferably effected by using a solution of a strong base in a suitable solvent, the latter in turn being one which will dissolve the keto-steroid.

For the purpose of the invention examples of strong bases which can be used include particularly alkali metal (e.g. sodium or potassium) alkoxides of tertiary aliphatic alcohols e.g. tertiary butanol or tertiary amyl alcohol. The liquid medium employed will depend to some extent upon the nature of the base used but should be substantially anhydrous, since water in quite small amounts, e.g. 1%, can deleteriously influence the reaction leading to poor yields. The base itself is in general best used in excess over the steroid e.g. in an amount of 8–20 equivalents of the steroid.

Where the basic substance is an alkoxide a convenient liquid medium is an alcohol especially the alcohol from which the alkoxide is derived. Particularly satisfactory are combinations of tertiary aliphatic alcohols together with their alkoxides.

With certain bases, which are themselves strong, e.g. alkali metal hydrides, alkali metal amides, and hindered alkali metal alkyl derivatives e.g. sodium triphenyl methyl, the alkali metal salt of the enolate may precipitate in the solvent used, thus preventing or hindering oxygenation. In general it is desirable to effect oxygenation under homogeneous conditions and thus where precipitation occurs it may be necessary to use other solvents e.g. liquid ammonia to ensure single phase conditions.

The oxygenation may be carried out by agitating a solution of the steroid in the basic enolising medium with oxygen, if desired under pressure.

The course of the reaction is readily followed by measuring the volume of oxygen absorbed. In general, it is desirable to effect the reaction as quickly as possible, particularly in the presence of an enolising medium, to avoid decomposition of the end-products. In some cases the reaction tends to be very fast and it may be found that it will be complete in 10 minutes or less. In other cases the reaction may take upwards of an hour. The speed of reaction would appear to be very dependant upon the structure of the compound particularly in ring C. Thus, we found that an 11-ketone reacted considerably more slowly than a $\Delta^{9(11)}$-compound, and that a compound with a saturated, unsubstituted ring C reacted more slowly still. The reaction is also affected by configuration of neighbouring groups. For example, in the introduction of an oxygen function at $C_{(17)}$ in 20-keto steroids the rate of reaction is influenced if there is a 16-alkyl substituent. Thus if the alkyl substituent has the β-configuration the reaction would appear to be completed more quickly than if the alkyl group has the α- configuration. The hydroperoxide formed may not be very stable in the basic enolising medium and it is desirable to keep the reaction time to a minimum if it is desired to isolate the hydroperoxide.

The rate of oxygenation is influenced by the concentration of base in the enolising medium and preliminary trial with the desired basic enolising medium will indicate the most suitable concentration of base to give a high rate of oxygenation.

The oxygenation is conveniently effected at or around ambient temperature but temperatures varying from 0° to 35° C. may be employed, if desired, At temperatures below ambient temperature however, the yield obtained may be lower.

Where it is possible to isolate the hydroperoxide this may be effected in any convenient manner e.g. by making the reaction mixture slightly acid (e.g. with acetic acid) and then precipitating the hydroperoxide with water or extracting it with an organic solvent and evaporating to dryness. To avoid decomposition during evaporation it may be advisable to employ a temperature not exceeding about 50° C.

The hydroperoxide may be converted to the corresponding hydroxyl compound by reduction e.g. by catalytic hydrogenation or by a chemical reducing agent e.g. zinc in acetic acid, potassium iodide in acetic acid, or sodium sulphite. The reducing conditions should however be chosen so that the structure of the steroid is otherwise unaffected, unless by intention, and this may preclude the use of strong acids and strong bases particularly with 17α-hydroxy-20-keto steroids. Where catalytic hydrogenation is employed, a suitable catalyst is palladium, preferably on an inert carrier e.g. charcoal. The hydrogenation may be effected in a solvent such as ethanol, ethyl acetate, dioxan, tetrahydrofuran, etc.

The process according to the invention is of particular value in that it provides a new and simple method of introducing a 17α-hydroxy group into 20-keto steroids (in their enolic form), and in particular into 20-keto steroids having a 16β-alkyl, particularly a 16β-methyl, substituent. For reasons explained above, there appear to be difficulties in the use of 16α-alkyl substituents.

The process according to the invention is also of particular value in the introduction of a 17α-hydroxy group into 20-keto steroids containing a 9,11-double bond since, in general, it is not necessary to protect the latter during oxygenation. This is in contrast to the conventional method of Gallagher (Fieser and Fieser, "Steroids," Reinhold Publishing Corp., New York, 1959, pp. 653–656).

Another group of keto steroids which can be used with advantage in the process according to the invention are 12-keto steroids e.g. hecogenin and botogenin and their esters. Oxygenation of such steroids by the process according to the invention leads to 11:12-diketones, which can be used as intermediates for the synthesis of pharmacologically active steroids having an oxygen function at the 11-position e.g. cortisone or prednisolone.

The process according to the invention has also been found to be useful for the introduction of a 5α-hydroxy group into a 6-keto steroid.

It would appear that the process according to the invention may possess a degree of stereo-specificity depending on the precise structure of the starting material. Thus, only one isomer was obtained on oxygenating enolic products of 20-ketones and 6-ketones, namely the the isomer having the α-configuration.

The process according to the invention is therefore a highly useful method for the introduction of oxygen functions into various positions of a steroid molecule and is applicable to pregnanes, spirostanes, oestranes, androstanes, cholanes, cholestanes, ergostanes, lanostanes and stigmastanes (in each case the steroid may be 5α- or 5β-) together with their various unsaturated derivatives e.g. pregnenes, pregnadienes, etc. and homo and nor derivatives having appropriately positioned enol groups.

In steroid molecules containing two or more keto groups it is possible by selective protection e.g. by ketalisation, formation of enol ethers etc. to oxygenate at a position adjacent to one of the keto groups. Where it is desired to leave the resulting hydroperoxide group intact the protecting group must be removable under mild conditions. Alternatively, where one keto group is more reactive than others selective oxygenation is possible.

It should be noted that in the presence of a basic enolising medium an ester group, e.g. 3-acetoxy, in the steroid molecule is usually hydrolysed. The possibility of preventing this will depend on the speed of oxygenation. Moreover, if extermely dry conditions are used it may be possible to hinder the hydrolysis.

Whilst we normally prefer to form the steroid enol from the corresponding ketone in a basic enolising medium it should be noted that it is not essential to form the enol in this manner. Thus, we have successfully oxygenated steroid enols obtained by other means (cf. Example 16).

The hydroperoxy compounds obtained by the process according to the invention are new and may be used as intermediates in the manufacture of pharmacologically active compounds or may themselves possess pharmacological action. Thus, important new compounds according to the invention are steroids having a hydroperoxy group attached to a tertiary carbon atom in a α-position to a keto group e.g. having a 17α-hydroperoxy group and a 20-keto group with or without a 16β-methyl group.

Compounds having pharmacological action include steroids of the pregnane (5α or 5β) series having a 20-keto group, a 17-hydroperoxy group and a 3-keto or 3-hydroxy group (or an etherified or esterified hydroxy group or an enolised keto group) with or without one or more double bonds in the ring. For example 3β-hydroxy-17α-hydroperoxy-5α-pregnan-20-one is an active progestational compound as is also, although to a lesser extent, the corresponding 3α-hydroxy-5β-compound. Other compounds having progestational activity include 17α-hydroperoxy progesterone and its 3-enol ethers.

In order that the invention may be well understood the following examples are given by way of illustration only. In these examples the temperatures were measured in degrees centigrade.

EXAMPLE 1

*Hydroperoxidation of 3β-Acetoxy-16β-Methyl-5α-Pregn-9-(11)-En-20-One Using t-Amyl Alcohol as Solvent*

Sodium (2 g.) was refluxed with t-amyl alcohol (240 ml.) until dissolved, and the solution was then shaken in oxygen until there was no further absorption. 3β-acetoxy-16β-methyl-5α-pregn-9(11)-en-20-one (2 g.) was added and the solution was shaken with oxygen for 10 minutes. Acetic acid (20 ml.) was added and the t-amyl alcohol was distilled off at 50° under reduced pressure. Water (100 ml.) was added and the solution was extracted with chloroform. The extract was washed with water, dried ($MgSO_4$), and evaporated to dryness under reduced pressure at 40°, to give a yellow solid (1.6 g.), M.P. 149–157°. Crystallisation from ethyl acetate gave 17α-hydroperoxy-3β-hydroxy-16β-methyl - 5α - pregn - 9(11)-en-20-one (0.95 g.≡49%) in two crops, M.P. 162.5–165°, $[\alpha]_D$ +67° (c., 1.0 in MeOH). (Found: C, 72.7; H, 9.5. $C_{22}H_{34}O_4$ requires C, 72.9; H, 9.45%.)

EXAMPLE 2

*Hydroperoxidation of 3β-Acetoxy-16β-Methyl-5α-Pregn-9-(11)-En-20-One Using t-Butyl Alcohol as solvent*

Sodium (5 g.) was refluxed with t-butyl alcohol (500 ml.) until dissolved, and the solution was shaken in oxygen until there was no further absorption. 3β-acetoxy-16β-methyl-5α-pregn-9(11)-en-20-one (5 g.), dissolved in t-butanol (40 ml.), was added and the solution was shaken in oxygen for 10 mins. Acetic acid (40 ml.) and water (100 ml.) were added and the t-butanol distilled off at 40° under reduced pressure. Water (200 ml.)

was added and the solution left at 0° overnight. The white solid which formed was filtered off and dried under vacuum at 60° to give crude 17α-hydroperoxy-3β-hydroxy-16β-methyl-5α-pregn-9(11)-en-20-one (4.9 g.), M.P. 154–158°, [α]$_D$ +44° (c.=1.0 in MeOH). Crystallisation from ethyl acetate gave the pure hydroperoxide (2.9 g.≡59.%), M.P. 162–165°, [α]$_D$ +67° (c.=1.0 in MeOH).

EXAMPLE 3

(a) *Hydroperoxidation of 3β-Acetoxy-16β-Methyl-5α-Pregn-9(11)-En-20-One Using Potassium t-Butoxide in t-Butanol*

Potassium (2 g.) was refluxed with t-butyl alcohol (45 ml.) until dissolved, and the solution was shaken in oxygen until there was no further absorption. 3β-acetoxy-16β-methyl-5α-pregn-9(11)-en-20-one (0.5 g.), dissolved in t-butanol (5 ml.), was added and the solution was shaken in oxygen for 20 mins. The reaction mixture was poured into 2% acetic acid (500 ml.) and the white solid which formed was filtered off and dried at 60° under vacuum to give 17α-hydroperoxy-3β-hydroxy-16β-methyl-5α-pregn-9(11)-en-20-one (380 mg.); M.P. 161–163°; [α]$_D^{25}$ +63° (c., 1.0 in methanol).

(b) *3β,17α-Dihydroxy-16β-Methyl-5α-Pregn-9(11)-En-20-One*

Palladium-on-charcoal (10%; 300 mg.), suspended in ethanol (20 ml.), was hydrogenated at ordinary temperature and pressure. 17α-hydroperoxy-3β-hydroxy-16β-methyl-5α-pregn-9(11)-en-20-one (1 g.), dissolved in ethanol (30 ml.), was added and the solution was hydrogenated for 25 mins. The catalyst was filtered off through kieselguhr, water added and the ethanol distilled off under reduced pressure. The solution was stored at 0° for 2 hours and the white solid which formed was filtered off and dried to give crude 3β,17α-dihydroxy-16β-methyl-5α-pregn-9(11)-en-20-one (0.808 g.), M.P. 186–190°; [α]$_D^{25}$ +32° (c., 1.0 in dioxan). Crystallization from aqueous methanol gave 0.543 g. of crystalline material, M.P. 194–198°, [α]$_D^{25}$ +39° (c., 1.0 in dioxan).

EXAMPLE 4

*3β,17α-Dihydroxy-16β-Methyl-5α-Pregn-9(11)-En-20-One*

17α-hydroperoxy-3β-hydroxy-16β-methyl-5α-pregn-9(11)-en-20-one (926 mg.) was dissolved in acetic acid (80 ml.) and zinc dust (2.5 g.—acid-washed) was added. The reaction mixture was shaken for 4 hours 15 mins. at room temperature. The zinc was filtered off and washed with ethyl acetate, water was added to the combined filtrates and the solution was extracted with ethyl acetate. The extract was washed with sodium bicarbonate solution and water, dried over magnesium sulphate, filtered and evaporated to dryness under reduced pressure to give a semi-crystalline white solid (870 mg.), M.P. 194–203°, [α]$_D$ +39° (c., 1.0 in dioxan). Crystallisation from aqueous methanol gave 3β,17α-dihydroxy-16β-give a semi-crystallihne white solid (870 mg.), M.P. crops, M.P. 199–204°, [α]$_D$ +39° (c., 1.0 in dioxan).

EXAMPLE 5

Cholestanone (100 mg.) was added to 1 N-potassium tert-butoxide in tert-butanol (10 ml.) and the mixture was shaken with oxygen. One mole of oxygen was absorbed in 15–20 minutes and the solution became strongly yellow. An equal volume of water was then added, the mixture was acidified with 6 N-HCl and then extracted with ether. The ether extract was washed with water, extracted with aqueous sodium bicarbonate solution, washed with water again and evaporated to dryness leaving cholestan-2,3-dione. Yield, 60%, as estimated by U.V. spectrum. The product was crystallised from aqueous ethanol to give crystals M.P. 140–144°, acetate 130–133°.

EXAMPLE 6

The procedure of Example 5 was repeated using lanost-8-en-3-one in place of cholestanone. Lanost-8-en-2,3-dione was obtained in 75% yield. On crystallisation from diethyl ether/abs. ethanol crystals were obtained M.P. 155–157°, [α]$_D^{23}$=+48° (acetone). The acetate has M.P. 135–138°.

EXAMPLE 7

(i) *3β-Hydroxy-16-Methyl-5α-Pregna-9(11),16-Dien-20-One*

3β-acetoxy-16-methyl-5α-pregna-9(11),16-dien-20-one (10 g.) was dissolved in methylene chloride (60 ml.) and added to methanol (700 ml.) containing perchloric acid (20 ml., 60% w./w.). The solution was allowed to stand overnight at room temperature, poured into water and the white solid was filtered off and dried. Crystallization from methanol gave 3β-hydroxy-16-methyl-5α-pregna-9(11),16-dien-20-one in three crops (7.5 g., 85%), M.P. 192–194°, [α]$_D$ +59° (c., 1.0 in CHCl$_3$). A purified sample had M.P. 198–199°, [α]$_D$ +59° (c., 1.0 in CHCl$_3$). (Found: C, 80.4; H, 9.7. C$_{22}$H$_{32}$O$_2$ requires C, 80.4; H, 9.8%.)

(ii) *3β-Hydroxy-16β-Methyl-5α-Pregn-9(11)-En-20-One*

Palladium-on-charcoal (10%; 0.75 g.), suspended in tetrahydrofuran (80 ml.), containing triethylamine (10 ml.), was hydrogenated at room temperature and pressure. 3β-hydroxy-16-methyl-5α-pregna-9(11),16-dien-20 - one (5 g.), dissolved in tetrahydrofuran (20 ml.), was added and the solution was hydrogenated until no further absorption occurred and 1.07 mols of hydrogen had been taken up (15 min.). The catalyst was filtered off through kieselguhr and the filtrate was poured into water and extracted with ethyl acetate. The extract was washed with 2 N-hydrochloric acid, saturated aqueous sodium bicarbonate, and water, dried over magnesium sulphate, filtered, and evaporated to dryness under reduced pressure. Crystallisation of the residue from methanol gave 3β-hydroxy-16β-methyl-5α-pregn-9(11)-en-20 - one (3.6 g., 72%), M.P. 165–168°, [α]$_D$ +38° (c., 1.0 in chloroform). (Found: C, 79.95; H, 10.4. C$_{22}$H$_{34}$O$_2$ requires C, 79.7; H, 10.45%.)

(iii) *Hydroperoxidation of 3β-Hydroxy-16β-Methyl-5α-Pregn-9(11)-En-20-One*

(a) WITH POTASSIUM t-BUTOXIDE IN t-BUTYL ALCOHOL AT ORDINARY PRESSURE

3β-hydroxy-16β-methyl-5α-pregn-9(11)-en - 20 - one (0.5 g.) in t-butyl alcohol (5 ml.) was added to a solution of potassium t-butoxide (1.5 g. potassium in 45 ml. t-butyl alcohol) and the solution was shaken with oxygen for 4 minutes, during which time 1 molecule of gas was absorbed. Isolation as in Example 3(a) and crystallisation from aqueous methanol gave 17α-hydroperoxy-3β-hydroxy-16β-methyl-5α-pregn-9(11)-en-20 - one (50%), M.P. 161–163° (decomp.), [α]$_D$ +67° (c., 1.0 in MeOH).

(b) WITH POTASSIUM t-BUTOXIDE IN t-BUTYL ALCOHOL AT 3 ATMOSPHERES PRESSURE

Potassium (1.5 g.) was dissolved in t-butyl alcohol (45 ml.) and transferred to the pressure bottle of a hydrogenator. The steroid (0.5 g.) was dissolved in t-butyl alcohol (5 ml.) and sealed in a thin glass bulb, which was also placed in the pressure bottle. The bottle was evacuated and filled with oxygen at a pressure of 3 atmospheres. The bottle was shaken mechanically, when the bulb containing the steroid was broken. The oxygenation was carried out for a further 5 minutes, and the solution was poured into water containing acetic acid (5 ml.); the white solid (550 mg.) was filtered off and dried; M.P. 150–158°, [α]$_D$ +47° (c., 1.0 in MeOH), peroxide content 72%.

(iv) *3β,17α-Dihydroxy-16β-Methyl-5α-Pregn-9(11)-En-20-One*

17α-hydroperoxy-3β-hydroxy-16β-methyl-5α-pregn-9(11)-en-20-one (250 mg.) was disolved in ethanol (5 ml.), and acetic acid (5 ml.) and zinc dust (0.75 g.) were added. The reduction was carried out as in Example 4 to give material (225 mg.), M.P. 190–195°, $[\alpha]_D$ +38° (c., 1.0 in dioxan).

EXAMPLE 8

(a) *3β-Acetoxy-17α-Hydroperoxy-16β-Methyl-5α-Pregn-9(11)-En-20-One*

3β-acetoxy-16β-methyl-5α-pregn-9(11)-en-20-one (250 mg.) in t-butyl alcohol (5 ml.), was added to a solution of sodium t-butoxide (250 mg. sodium in 25 ml. t-butyl alcohol) and the solution was shaken with oxygen for 10 minutes, during which time about one molecule of oxygen was absorbed. Isolation as in Example 3(a) and crystallisation from aqueous methanol gave 3β-acetoxy-17α-hydroperoxy-16β-methyl-5α-pregn-9(11)-en-20 - one, M.P. 156–158°, $[\alpha]_D$ +57° (c., 1.0 in MeOH). The analytical specimen had M.P. 161–164° (decomp.), $[\alpha]_D$ +57° (c., 1.0 in MeOH). (Found: C, 71.1; H, 9.1. $C_{24}H_{36}O_5$ requires C, 71.25; H, 9.0%.)

(b) *3β-Acetoxy-17α-Hydroxy-16β-Methyl-5α-Pregn-9-(11)-En-20-One*

3β-Acetoxy-17α-hydroperoxy-16β-methyl-5α-pregn - 9-(11)-en-20-one (100 mg.) was dissolved in acetic acid (10 ml.), and zinc dust (400 mg.; acid-washed) was added. The reaction mixture was shaken at room temperature for 4½ hours, the zinc was filtered off and the precipitate was washed with ethyl acetate. The combined filtrate and washings were diluted with water, extracted with ethyl acetate, the extract washed with sodium bicarbonate solution and water, dried over magnesium sulphate, filtered and evaporated to dryness, to give a white solid (110 mg.), M.P. 158–160°. Crystallisation from aqueous methanol gave 3β - acetoxy-17α-hydroxy-16β-methyl-5α-pregn-9(11)-en-20-one (63%), M.P. 163–166°, $[\alpha]_D$ +32° (c., 1.0 in dioxan).

EXAMPLE 9

(i) *17α-Hydroperoxy-3β-Hydroxy-5α-Pregnane-11,20-Dione*

(a) 3β-acetoxy-5α-pregnane-11,20 - dione (1 g.), dissolved in t-butyl alcohol (10 ml.), was added to a solution of potassium t-butoxide, prepared from potassium (2 g.) and t-butyl alcohol (45 ml.), and the solution was shaken with oxygen for 20 mins.; absorption of 1 molecule of gas had occurred after about 10 mins. Isolation as in Example 3(a) and crystallisation from ethyl acetate gave 17α-hydroperoxy-3β-hydroxy-5α-pregnane-11,20-dione (54%), M.P. 161–163° (decomp.), $[\alpha]_D$ +71° (c., 1.0 in MeOH). (Found: C, 69.0; H, 8.9. $C_{21}H_{32}O_5$ requires C, 69.2; H, 8.85%.)

(b) Hydroperoxidation of 3β-hydroxy-5α-pregnane-11,20- dione under similar conditions to those described in (a), but decreasing the total reaction time to 10 minutes gave 17α-hydroperoxy-3β-hydroxy-5α-pregnane - 11,20-dione in 51% yield.

(ii) *3β,17α-Dihydroxy-5α-Pregnane-11,20-Dione*

17α-hydroperoxy-3β-hydroxy-5α-pregnane-11,20 - dione (100 mg.) in acetic acid (30 ml.) was reduced with zinc (400 mg.) and the product isolated as in Example 4. Crystallisation from aqueous methanol gave 3β,17α-dihydroxy-5α-pregnane-11,20-dione (78%), M.P. 284–287°, $[\alpha]_D$ +65° (c., 1.0 in dioxan).

EXAMPLE 10

(i) *17α-Hydroperoxy-3α-Hydroxy-5β-Pregnane-11,20-Dione*

(a) 3α-acetoxy-5β-pregnane-11,20-dione (1 g.), dissolved in t-butyl alcohol (10 ml.), was added to a solution of potassium t-butoxide (2 g. potassium dissolved in 40 ml. of t-butyl alcohol) and the solution was shaken with oxygen for 25 minutes; after 4 minutes 1 molecule of gas had been absorbed. Isolation as in Example 3(a) and crystallisation from ethyl acetate gave 17α-hydroperoxy-3α-hydroxy-5β-pregnane-11,20-dione (57%), M.P. 158–160° (decomp.), $[\alpha]_D$ +85° (c., 1.0 in MeOH). (Found: C, 69.0; H, 8.8. $C_{21}H_{32}O_5$ requires C, 69.2; H, 8.85%.)

(b) Hydroperoxidation of 3α-hydroxy-5β-pregnane-11,20-dione under similar conditions but decreasing the total reaction time to 10 minutes (when absorption of oxygen was complete), gave 17α-hydroperoxy-3α-hydroxy-5β-pregnane-11,20-dione in 33% yield.

(ii) *3α,17α-Dihydroxy-5β-Pregnane-11,20-Dione*

17α - hydroperoxy - 3α - hydroxy - 5β - pregnane-11,20-dione (84 mg.) in acetic acid (25 ml.) was reduced with zinc (500 mg.) and the product isolated as in Example 4. Crystallisation from aqueous methanol gave 3α,17α-dihydroxy-5β-pregnane-11,20-dione (70%), M.P. 203–208°, $[\alpha]_D$ +66° (c., 1.0 in acetone).

EXAMPLE 11

(i) *17α-Hydroperoxy-3β-Hydroxy-5α-Pregnan-20-One*

(a) 3β-acetoxy-5α-pregnan-20-one (1 g.), dissolved in t-butyl alcohol (10 ml.), was added to a solution of potassium t-butoxide (2 g. potassium dissolved in 40 ml. t-butyl alcohol) and the solution was shaken with oxygen for 38 mins.; 1 molecule of gas was absorbed after about 14 mins. Isolation as in Example 3(a) and crystallisation from methanol gave 17α-hydroperoxy-3β-hydroxy-5α-pregnan-20-one (35%), M.P. 169–172° (decomp.), $[\alpha]_D$ +54° (c., 0.5 in MeOH). (Found: C, 71.6; H, 10.05. $C_{21}H_{34}O_4$ requires C, 71.9; H, 9.8%.)

(b) 3β-hydroxy-5α-pregnan-20-one (5 g.), dissolved in t-butyl alcohol (50 ml.), was added to a solution of potassium t-butoxide (5 g. potassium dissolved in 75 ml. t-butyl alcohol) and the solution was oxygenated for 45 mins. and worked up as described previously to give crude 17α-hydroperoxy-3β-hydroxy-5α-pregnan-20-one (5 g.). Trituration with a small quantity of ether gave 3.5 g. of material with M.P. 160–162°; crystallisation from ethanol then gave 17α-hydroperoxy-3β-hydroxy-5α-pregnan-20-one in 44% yield, M.P. 172–174°, $[\alpha]_D$ +54° (c., 0.5 in MeOH).

(ii) *3β,17α-Dihydroxy-5α-Pregnan-20-One*

17α-hydroperoxy-3β-hydroxy-5α-pregnan - 20 - one (65 mg.) in acetic acid (25 ml.) was reduced with zinc (500 mg.) and the product isolated as in Example 4. Crystallisation from ethyl acetate gave 3β,17α-dihydroxy-5α-pregnan-20-one (59%), M.P. 251–256°, $[\alpha]_D$ +35° (c., 1.0 in EtOH).

EXAMPLE 12

(a) *17α-Hydroperoxy-3α-Hydroxy-5β-Pregnan-20-One*

3α-hydroxy-5β-pregnan-20-one (2 g.), dissolved in t-butyl alcohol (20 ml.), was added to a solution of potassium t-butoxide (4 g. potassium dissolved in 80 ml. t-butyl alcohol) and the solution was shaken with oxygen for 45 mins.; 1 molecule of oxygen was absorbed in about 35 mins. Isolation as in Example 3(a) and crystallisation from ethyl acetate gave 17α-hydroperoxy-3α-hydroxy-5β-pregnan-20-one (1.0 g., 46%), M.P. 162–163° (decomp.), $[\alpha]_D$ +64° (c., 1.0 in MeOH).

(b) *3α,17α-Dihydroxy-5β-Pregnan-20-One*

17α-hydroperoxy-3α-hydroxy-5β-pregnan - 20 - one (90 mg.) was dissolved in acetic acid (25 ml.), zinc (300 mg.) was added and the solution was shaken for 4 hours. The zinc was filtered off and the precipitate washed with chloroform. The combined filtrate and washings were washed with sodium bicarbonate solution and water, dried (MgSO₄), and evaporated to dryness, to give a white solid (89 mg.). Crystallisation from aqueous methanol gave 3α,17α-dihydroxy-5β-pregnan-20-one (62%), M.P. 213–216°, [α]$_D$ +63° (c., 1.0 in ethanol).

EXAMPLE 13

(a) 3-Ethoxy-17α-Hydroperoxypregna-3,5-Dien-20-One

Progesterone 3-enol ethyl ether (1.8 g.) was added to a solution of potassium t-butoxide (2 g. potassium dissolved in 50 ml. t-butyl alcohol) and the solution was shaken with oxygen for 30 mins., during which time 1 mol. of oxygen was absorbed. The solution was poured into water, extracted with ethyl acetate, washed with water and dried for a short time over MgSO$_4$. Evaporation of the solution to a small volume under reduced pressure at about 40° C. gave a white solid (900 mg.), M.P. 130–137°. Crystallisation from aqueous acetone gave 3-ethoxy-17α-hydroperoxypregna-3,5-dien-20-one (590 mg.; 30%), M.P. 135–137°, [α]$_D$ −84° (c., 0.5 in MeOH), γ max. 239–240 mµ, $E^{1\%}_{1cm.}$ 484

(Found: C, 73.5; H, 9.25. C$_{23}$H$_{34}$O$_4$ requires C, 73.8; H, 9.15%.)

EXAMPLE 14

17α-Hydroperoxyprogesterone 3-ethoxy-17α-hydroperoxypregna-3,5-dien-20-one (500 mg.) was dissolved by warming in methanol (25 ml.) and acetic acid (25 ml.), the solution was cooled to room temperature and the reaction was followed by change in rotation; the rotation was constant after about 2 hours. After a further 30 minutes, the reaction mixture was poured into water and the white solid was filtered off; crystallisation from aqueous methanol gave 17α-hydroperoxyprogesterone (348 mg.; 75%), M.P. 186–189° (decomp.), [α]$_D$ +116° (c., 0.5 in MeOH), λ max. 238–239 mµ, $E^{1\%}_{1cm.}$ 483

(Found: C, 72.8; H, 8.7. C$_{21}$H$_{30}$O$_4$ requires C, 72.8; H, 8.7%.)

EXAMPLE 15

(a) 5α-Hydroperoxy-3β-Hydroxycholestan-6-One

3β-hydroxycholestan-6-one (0.5 g.), dissolved in t-butyl alcohol (10 ml.), was added to a solution of potassium t-butoxide (1.5 g. potassium dissolved in 45 ml. t-butyl alcohol) and the solution was shaken with oxygen for 36 mins.; 1 molecule of oxygen was absorbed after 26 mins. The solution was poured into water (1,000 ml.) containing acetic acid (10 ml.) and extracted with methylene chloride. The extract was washed with water, dried (MgSO$_4$) and evaporated to dryness. The gummy residue was crystallised from ethyl acetate (charcoal) to give 5α-hydroperoxy-3β-hydroxycholestane-6-one (20%), M.P. 192–195° (decomp.), [α]$_D$ −5° (c., 1.0 in MeOH). (Found: C, 74.35; H, 10.6. C$_{27}$H$_{46}$O$_4$ requires C. 74.6; H, 10.7%.)

(b) 3β,5α-Dihydroxycholestan-6-One

5α-hydroperoxy-3β-hydroxycholestan-6-one (25 mg.) was dissolved in acetic acid (10 ml.) and the solution was shaken with zinc (300 mg.) for 4 hours. The zinc was filtered off, the precipitate washed with ethyl acetate, the combined filtrates were washed with sodium bicarbonate solution and water, dried (MgSO$_4$) and evaporated to dryness to give a white solid (26 mg.). Crystallisation from aqueous methanol gave 3β,5α-dihydroxycholestan-6-one (50%), M.P. 232–234°, [α]$_D$ −24° (c., 0.5 in CHCl$_3$).

EXAMPLE 16

Treatment of Hecogenin With Oxygen in Basic Medium

Hecogenin (1 g.), dissolved in t-butyl alcohol (30 ml.), was added to a solution of potassium t-butoxide (4 g. potassium in 90 ml. t-butyl alcohol) and the solution was shaken with oxygen for 3½ hours, during which time nearly 2 mol. of oxygen was absorbed. The solution was poured into water (1,000 ml.) containing acetic acid (10 ml.), the product was stored at 0° for 2 hours, filtered and dried. The product had M.P. 158–163°, [α]$_D$ −22° (c., 1.0 in CHCl$_3$). The crude product (1.1 g.) was dissolved in pyridine (6 ml.) and acetic anhydride (8 ml.) was added; the solution was heated on a steam bath for 4 hours, poured on to ice and the solid filtered off and dried. The product (0.9 g.) was dissolved in benzene and chromatographed on magnesium trisilicate (100 g.), the column being eluted with benzene and benzene containing ethyl acetate. Crystallisation of the eluted material from ethanol, gave as 1st crop, hecogenin acetate (100 mg.), M.P. 238–242°, [α]$_D$ −2° (c., 1.0 in CHCl$_3$). Concentration of the mother liquors gave 3β,11-diacetoxy-5α,25D-spirost-9(11)-en-12-one (152 mg.), M.P. 187–191°, [α]$_D$ +19° (c., 1.0 in CHCl$_3$), λ max. 243 mµ, $E^{1\%}_{1cm.}$ 189

(Found: C, 70.15; H, 8.6. Calc. for C$_{31}$H$_{44}$O$_7$: C, 70.4; H, 8.4%.)

EXAMPLE 17

(a) 3β-Acetoxy-16β-Methyl-5α-Pregna-9(11),17(20)-Dien-20-Ol

A solution of 3β-acetoxy-16-methyl-5α-pregna-9(11), 16-dien-20-one (100 g.) in tetrahydrofuran (1200 ml.) containing triethylamine (200 ml.) was hydrogenated in the presence of palladium-on-charcoal (10%, 8.5 g.); 6.5 l. of hydrogen were absorbed during 9 minutes. The solution was filtered and evaporated to dryness without excessive heating. The residue was suspended in acetone (200 ml.), filtered and the solid washed with acetone (3 x 50 ml.) and dried at 60° in vacuo. The enol (25.15 g.), so obtained, was purified by being suspended in acetone (500 ml.), which was then heated to reflux and cooled to room temperature. The 3β-acetoxy-16β-methyl-5α-pregna-9(11),17(20)-dien-20-ol was filtered, washed with acetone (200 ml.) and dried at 60° in vacuo; 20.8 g., M.P. 134–140°, [α]$_D$ +30.6° (c., 1 in CHCl$_3$). (Found: C, 77.3; H, 9.7; active H, 0.21. C$_{24}$H$_{36}$O$_3$ requires C, 77.4; H, 9.7; active H, 0.27%.)

(b) 3β-Acetoxy-17α-Hydroperoxy-16β-Methyl-5α-Pregn-9(11)-En-20-One

3β-acetoxy-16β-methyl-5α-pregna-9(11),17(20)-dien-20-ol (2 g.) was dissolved in warm benzene (200 ml.). The solution was cooled to room temperature and shaken with oxygen until 1 molecule of the gas had been absorbed (ca. 2 minutes). Evaporation of the solution gave a white solid which, on crystallisation from aqueous methanol, yielded 3β-acetoxy-17α-hydroperoxy-16β-methyl-5α-pregn-9(11)-en-20-one; 0.95 g., M.P. 158–160°, [α]$_D$ +57° (c., 1.0 in MeOH).

We claim:

1. A process for the introduction of an oxygen function into at least one of the 2-, 5-, 11- and 17-positions of a steroid molecule containing an enol group which comprises reacting the steroid with molecular oxygen to yield said oxygen function on the carbon atom of said enol group adjacent to the carbon atom to which the hydroxy group of said enol group is attached, said oxygen function being a hydroperoxy group when said adjacent carbon atom is tertiary and an oxo group formed by spontaneous decomposition of a hydroperoxy group when said adjacent carbon atom is secondary.

2. A process as claimed in claim 1 in which the oxygen is used under pressure.

3. A process as claimed in claim 1 in which the hydroperoxide is recovered by making the reaction mixture slightly acid.

4. A process as claimed in claim 1 in which the oxygen function is a hydroperoxy group which is thereafter reduced to form a hydroxyl group.

5. A process as claimed in claim 4 in which the steroid enol corresponds to a 20-keto steroid and the process is used to introduce a 17α-hydroxy group.

6. A process as claimed in claim 5 in which the steroid enol has a 16β-alkyl substituent.

7. A process as claimed in claim 1 in which the enolic steroid is formed by enolising the corresponding keto steroid in a strongly basic enolising medium.

8. A process as claimed in claim 7 in which said medium is a solution of an alkali metal tertiary alkoxide in a tertiary alkanol.

9. A process as claimed in claim 7 in which said medium is a solution of an alkali metal tertiary alkoxide in a tertiary alkanol selected from the group consisting of tertiary butanol and tertiary amyl alcohol.

10. A process as claimed in claim 7 in which the base is used in an amount of 8-20 equivalents of the keto steroid.

11. 3β-hydroxy-17α-hydroperoxy-5α-pregnan-20-one.

12. 3α-hydroxy-17α-hydroperoxy-5β-pregnan-20-one.

13. A compound selected from the groups consisting of 17α-hydroperoxy-progesterone and its 3-lower alkyl enol ethers.

14. A compound selected from the group consisting of a compound of the formula

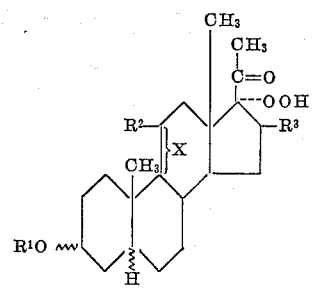

wherein $R^1$ is selected from the group consisting of hydrogen and an acyl group derived from a lower alkanoic acid, X designates a linkage selected from the group consisting of a single and a double bond, $R^2$ is an oxo group when X is a single bond and hydrogen when X is a double bond and $R^3$ is selected from the group consisting of hydrogen and a lower alkyl group; 17α-hydroperoxyprogesterone; and a lower alkyl 3-enol ether of 17α-hydroperoxyprogesterone.

15. A compound according to claim 14 wherein $R^3$ is a methyl group.

No references cited.